United States Patent
Wadkins

(10) Patent No.: US 6,311,715 B1
(45) Date of Patent: Nov. 6, 2001

(54) STACKED RUPTURE DISK ASSEMBLY

(75) Inventor: Thomas J. Wadkins, Hiram, OH (US)

(73) Assignee: Zook Enterprises, LLC, Chagrin Falls, OH (US)

( * ) Notice: Subject to any disclaimer, the term of this patent is extended or adjusted under 35 U.S.C. 154(b) by 0 days.

(21) Appl. No.: 09/612,144

(22) Filed: Jul. 7, 2000

(51) Int. Cl.[7] .................................................. F16K 17/40
(52) U.S. Cl. ..................... 137/68.23; 137/69; 137/910; 220/89.2
(58) Field of Search ............................. 137/68.18, 68.22, 137/68.23, 68.24, 68.27, 68.28, 910, 69; 220/89.2

(56) References Cited

U.S. PATENT DOCUMENTS

| | | | |
|---|---|---|---|
| 2,922,544 | * | 1/1960 | Hibbard et al. ...................... 220/89.2 |
| 2,952,383 | * | 9/1960 | Paxton et al. ........................ 220/89.2 |
| 4,102,469 | | 7/1978 | Shegrud et al. . |
| 4,263,929 | * | 4/1981 | Kearney ............................. 137/68.18 |
| 4,315,575 | * | 2/1982 | Schwarz et al. ..................... 220/89.2 |
| 4,631,200 | | 12/1986 | Bierschenk . |
| 4,937,019 | * | 6/1990 | Scott ............................. 137/68.23 X |
| 5,002,085 | * | 3/1991 | FitzGerald ......................... 137/68.27 |
| 5,012,945 | * | 5/1991 | Keenan .......................... 137/68.23 X |
| 5,121,847 | | 6/1992 | Ellis . |
| 5,313,194 | | 5/1994 | Varos . |
| 5,579,942 | * | 12/1996 | Palmer et al. ....................... 220/89.2 |
| 5,583,490 | | 12/1996 | Santos et al. . |
| 5,750,058 | | 5/1998 | Hecht et al. . |
| 5,934,308 | | 8/1999 | Farwell . |

FOREIGN PATENT DOCUMENTS 2307654  11/1999  (GB) .

* cited by examiner

*Primary Examiner*—John Rivell
(74) *Attorney, Agent, or Firm*—Watts, Hoffmann, Fisher & Heinke, Co., L.P.A.

(57) ABSTRACT

A stacked rupture disk assembly of the present invention is adapted to be positioned between flanges in a vent pipe or pressure relief port of a pressure vessel. The stacked rupture disk assembly includes a first rupture disk assembly and a second rupture disk assembly mechanically affixed to the first rupture disk assembly. Each rupture disk assembly includes a graphite rupture disk defining an annular support portion surrounding an thinner rupture membrane adjacent and flush with a first end of the annular support portion. The annular support portion and the rupture membrane define a substantially planar outer surface of the rupture disk. The annular support includes a recessed region extending from an opening in a second end of the annular support to the rupture membrane. Optionally, the second rupture disk assembly includes a support member having spaced apart first and second ends and adapted to be inserted into the recessed region such that the first end abuts and supports the rupture membrane. The support member is configured to permit fluid communication between the second side of the annular support portion and the rupture member. The first and second rupture disk assemblies are positioned in stacked alignment such that the second sides of the annular support portions are adjacent and the first sides of the annular support portions face outwardly. The stacked rupture disk assembly is oriented within the vent pipe flanges in a stacked configuration such that the planar side of the first rupture disk faces the pressure vessel and the planar side of the second rupture disk faces a vent side or a side away from the pressure vessel.

38 Claims, 4 Drawing Sheets

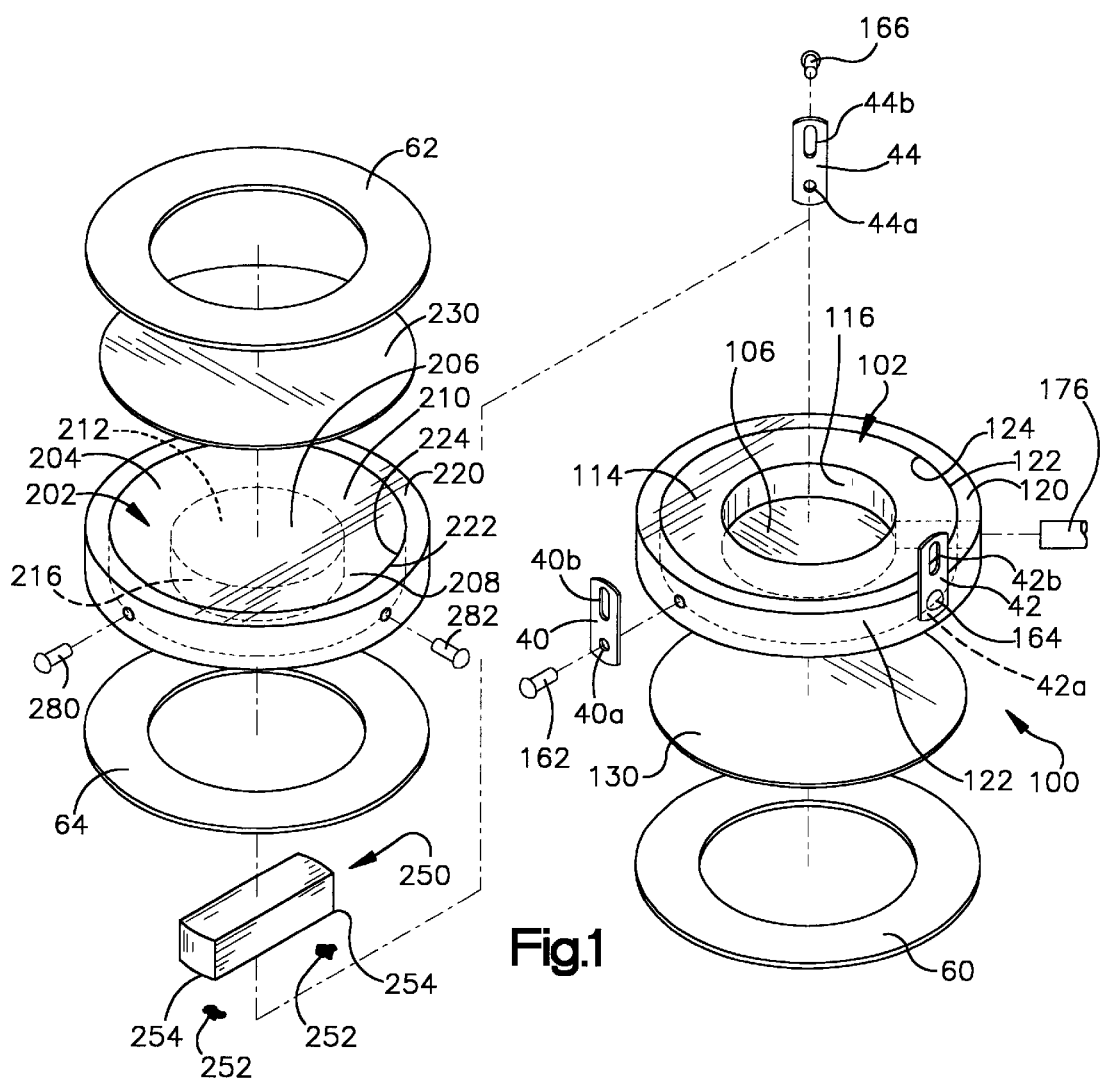
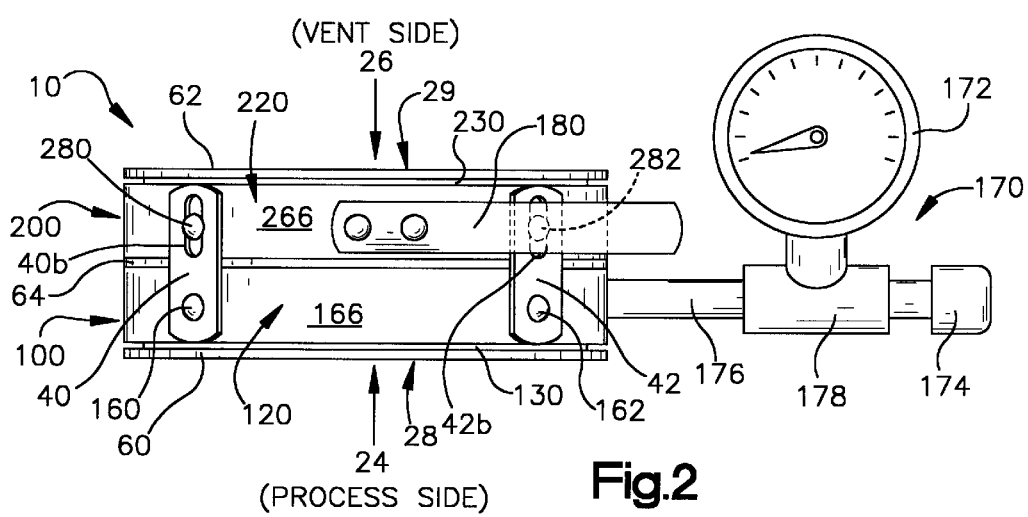

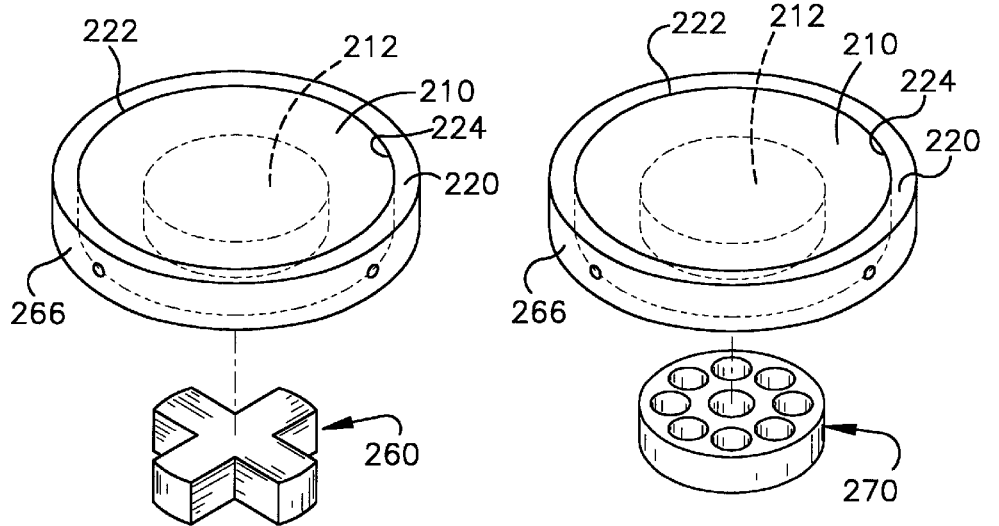
Fig.4
Fig.5
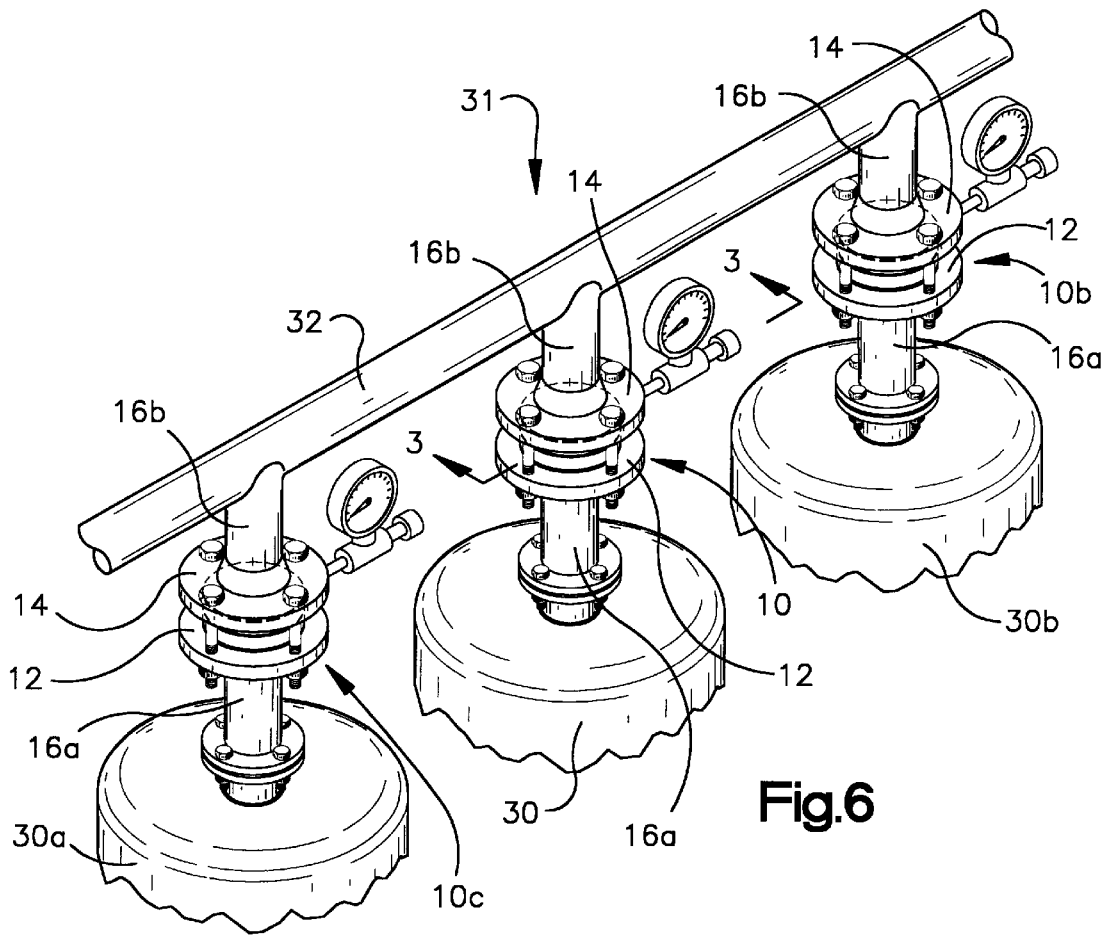
Fig.6

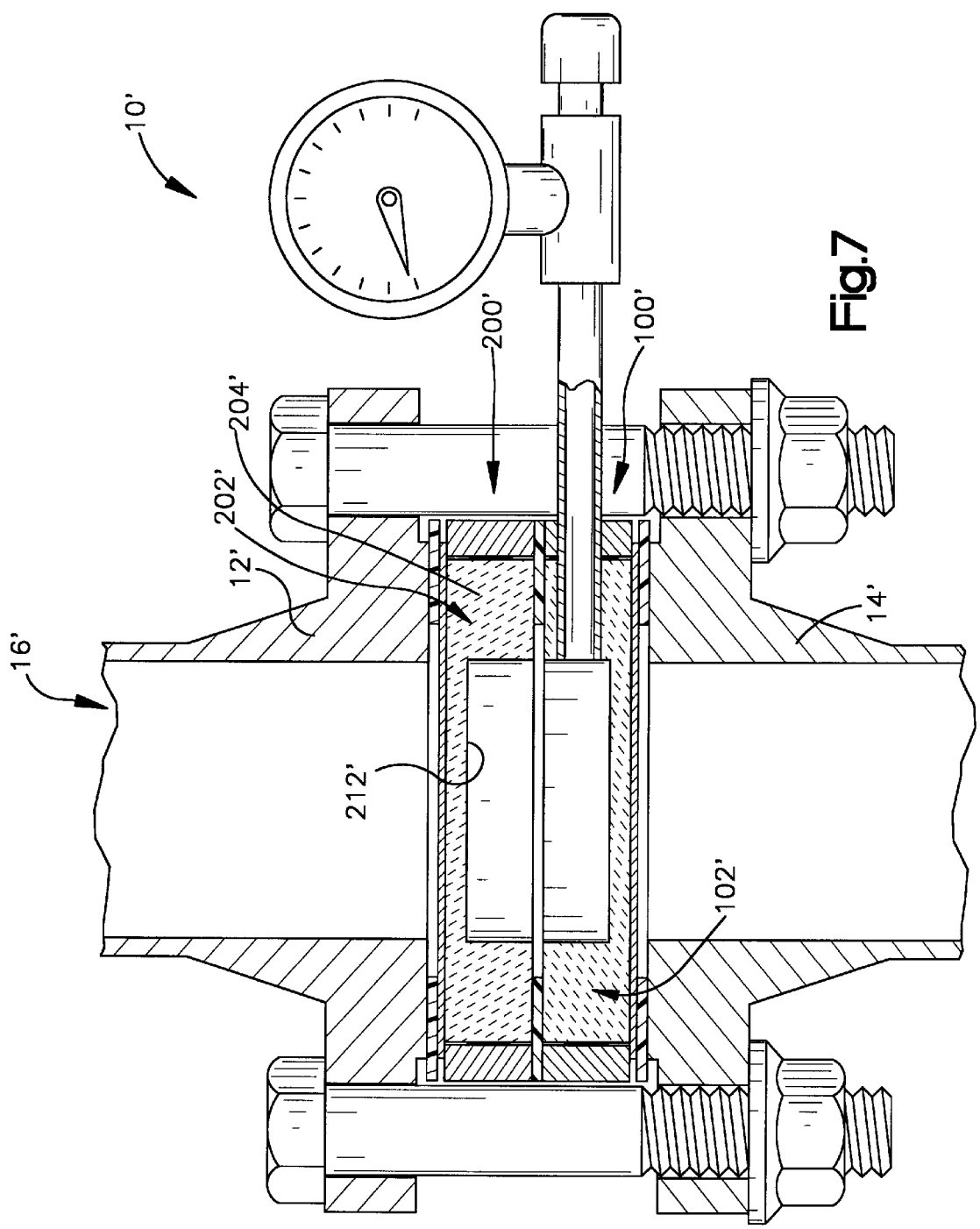

STACKED RUPTURE DISK ASSEMBLY

FIELD OF THE INVENTION

This invention relates generally to a rupture disk assembly that obturates a vent pipe or pressure relief port of a pressurized container and, more particularly, to a stacked rupture disk assembly having a stacked configuration providing vent side pressure protection to prevent unwanted rupture of a process side facing rupture disk of the assembly resulting from a surge in the vent side pressure.

BACKGROUND ART

A rupture disk is disposed between two standard pipe flanges along a vent pipe or relief port of a pressurized vessel. One side of the rupture disk faces the pressure vessel (referred to as the process side of the rupture disk) and is subject to the pressure in the pressure vessel. The opposite side of the rupture disk faces a piping system coupled to the vent pipe (referred to as the vent side of the rupture disk) and is subject to the pressure in the piping system. If the pressure in the vessel increases and the pressure differential between the process side and the vent side of the rupture disk exceeds a predetermined burst pressure rating of the rupture disk, the disk fragments or ruptures allowing release of pressure in the vessel though the vent pipe thereby avoiding failure of the pressure vessel.

Because of environmental concerns and regulatory requirements, fugitive gases exiting from the pressure vessel through the vent pipe upon rupture of the rupture disk are typically not permitted to be vented directly to the environment, for example, substances in the vessel may be toxic, carcinogenic, radioactive or otherwise harmful to the environment. Instead, the pressure vessel vent pipe is coupled to a piping system is utilized to collect fugitive discharge, that is, material, typically gas, discharged as a result of rupture of a rupture disk. In a facility with multiple pressure vessels, the piping system may be one of a number of types including common header and manifold. In a manifold piping system, individual vent pipes extend from each of the pressure vessels to a catch tank or discharge collection vessel. In a common header piping system, a single pipeline or conduit extends to a catch tank. The vent pipes from a plurality of pressure vessels are routed into the common header pipeline at various points along the pipeline.

If the maximum allowable pressures in a plurality of pressure vessels differ between vessels, then rupture disks having different burst ratings are required. For example, if the maximum allowable pressure in a first pressure vessel is 10 pounds per square inch gauge pressure (psig) and the maximum allowable pressure in a second pressure vessel is 100 psig, then first and second rupture disks having burst pressure ratings of 10 psig and 100 psig are installed between flanges in the vent pipes of the first and second pressure vessels respectively.

In a common header piping system, utilizing a plurality of rupture disks having different burst pressure ratings presents a problem because of short duration vent side or back pressure surges that result from fugitive discharges. That is, a low burst pressure rupture disk may rupture as a result of excess vent side pressure in the common header pipeline from a fugitive discharge even though the pressure in the pressure vessel is below the maximum burst pressure rating of the rupture disk. For example, if the pressure in the second pressure vessel increases and the pressure differential between the process and vent sides of the second rupture disk exceeds 100 psig, the second rupture disk will burst and fugitive discharge gas from the second vessel will be discharged through its vent pipe into the common header pipeline and be routed to the catch tank. Upon discharge of 100 psig fugitive discharge gas from the second pressure vessel, the pressure in the common header pipeline will increase as the fugitive gas enters the pipeline.

The pressure applied to the vent side of the first rupture disk as a result of fugitive discharge gas entering the common header pipeline from the second pressure vessel depends on various factors including the volume of discharge gas escaping from the second pressure vessel, the internal diameter of the common header pipeline and the distance along the common header pipeline between the first and second pressure vessel vent pipes. Under certain conditions, the vent side back pressure in the common header pipeline adjacent the first pressure vessel vent pipe may be a sufficient magnitude to create a pressure differential on the first rupture disk that causes the first rupture disk to fail or rupture due to vent side back pressure. It is important to note that a magnitude of pressure that results in failure of a rupture disk due to vent side back pressure is usually not the same as the process side burst pressure rating. While it is crucial that a rupture disk rupture when the process side burst pressure is exceeded (that is, the rupture disk ruptures in a direction of flow from process to vent), it is very undesirable for the rupture disk to fail in the opposite direction (that is, in a direction of flow from vent to process) due to excess vent side back pressure. An undesired rupture of the first rupture disk due to excess vent side back pressure results in contamination of the materials in the first pressure vessel by the fugitive gas in the common header pipeline as well as downtime, materials and maintenance costs associated with replacing the first rupture disk, cleaning the contaminated materials in the first pressure vessel, etc.

Any piping design where there is venting from vessels to a common piping system is subject to the risk of vent side back pressure undesirably rupturing or causing failure of a rupture disk, not just a common header piping system. However, the problem is more pronounced in a piping systems where the length of pipe separating the various pressure vessels is relatively short. A common header piping system typically will have a shorter piping distance between adjacent pressure vessels than, for example, a manifold piping system where each pressure vessel has its own individual vent pipe extending to the catch tank.

One solution to the problem of undesired vent side or back pressure ruptures is a line of rupture disks sold by Zook Enterprises, LLC of Chagrin Falls, Ohio, the assignee of the present invention, under the trade name Zook® Bak-Pressure™ disk. Bak-Pressure™ disk are offered in burst ratings from ¼ psig to over 1000 psig. Each Bak-Pressure™ Disk product is a rupture disk assembly that includes a graphite rupture disk and additionally may include a graphite or metal support member.

The graphite rupture disk comprises an annular support portion surrounding a thin pressure sensitive rupture membrane adjacent a first end of the annular support portion. The membrane blocks the flow of fluid in the vent pipe and is integral with the annular support portion. The rupture membrane is flush with the first end of the annular support portion and the membrane together define a substantially planar outer surface or wall of the rupture disk. The rupture membrane will break or rupture if the process side pressure exceeds the vent side or back pressure by more than a predetermined pressure rating of the rupture disk. A second end of the annular support portion and rupture membrane define a central cylindrical shaped recess extending inwardly from a second end of the support portion to the rupture membrane.

A graphite rupture disk may be mounted in two orientations: a mono orientation and an inverted orientation. In the mono orientation, the second end of the annular support portion of the rupture disk, that is, the end having the central cylindrical recess, faces the process side, that is, the pressure vessel. In the inverted orientation, the first end of the annular support portion, that is, the planar side of the rupture disk, faces the process side.

An important characteristic of a graphite rupture disk is that the burst pressure of the rupture disk is dependent upon the orientation of the rupture disk. Thus, when specifying the burst pressure of a graphite rupture disk the orientation of the rupture disk must also be specified. The relationship between the burst pressures of a rupture disk when mounted in the mono orientation versus the inverted orientation is dependent upon the diameter of the rupture disk and the thickness of the rupture disk membrane, but a general rule is that the burst pressure of the rupture disk in the mono orientation will be less than or equal to the burst pressure of the same rupture disk in the inverted orientation.

For example, a rupture disk having a very thin rupture membrane will have a burst pressure that is substantially equal in both the mono and inverted orientations, e.g., a 1 inch diameter rupture disk having a process side burst pressure of 10 psig in the mono orientation would also have a process side burst pressure of approximately 10 psig in the inverted orientation. As the thickness of the rupture membrane increases the difference between the burst pressure of a rupture disk depending on orientation will increase, e.g., an 4 inch diameter rupture disk having a process side burst pressure of 100 psig in the mono orientation would have a process side burst pressure of approximately 125 psig in the inverted orientation. A 4 inch diameter rupture disk having a process side burst pressure of 500 psig in the mono orientation would have a process side burst pressure of approximately 1000 psig in the inverted orientation.

A Zook® Bak-Pressure™ disk is mounted between flanges of a pressure vessel vent pipe in the mono orientation. Since the rupture disk is mounted in the mono orientation, the vent side back pressure that will cause failure or rupture of the disk will be at least equal to an typically greater than the process side burst pressure rating Under certain conditions, sufficient vent side or back pressure protection is provided by the vent side back pressure capability of the product's rupture disk. If a greater vent side pressure protection magnitude is desired, the Bak-Pressure™ disk may include a graphite or metal support. Such a support reinforces the rupture membrane and increases the product's capability to withstand vent side back pressure without failure.

Although the Zook® Bak-Pressure™ disks have been a commercial success, one shortcoming of such disks is that they do not permit installation of the rupture disk in the inverted orientation, that is, where the flat or planar side of the rupture disk faces the process side. The inverted orientation is advantageous because it is easier to affix protective corrosion and/or temperature resistant overlays (a layer and/or a coating) to a flat surface than to the cylindrical shaped recessed surface facing the process side when the disk is positioned in the mono orientation.

Thus, it would be desirable to have a rupture disk assembly that is adapted to be used in the inverted orientation in a pressure vessel vent pipe while still providing protection against undesired vent side back pressure rupture of the rupture disk.

SUMMARY OF THE INVENTION

It is an object of this invention to provide a rupture disk assembly disposed in a pressure vessel vent pipe or pressure relief port that includes a process side rupture disk oriented in the inverted orientation, while still providing protection against undesired vent side or back pressure rupture of the rupture disk.

A stacked rupture disk assembly of the present invention is adapted to be positioned between standard pipe flanges in a vent pipe or pressure relief port of a pressure vessel. The stacked rupture disk assembly includes a first rupture disk assembly facing the process side, that is, closer to the pressure vessel, and a second rupture disk assembly facing the vent side, that is, further from the pressure vessel, affixed to the first rupture disk assembly. Each rupture disk assembly includes a graphite rupture disk defining an annular support portion surrounding an thinner pressure sensitive rupture membrane adjacent and flush with a first end of the annular support portion. The first end of the annular support portion and the rupture membrane define a substantially planar end or outer surface of the rupture disk. The annular support portion includes a recessed region extending from an opening in a second end of the annular support portion to the rupture membrane. The second end of the annular support portion and the rupture membrane define a recessed end or outer surface of the rupture disk.

The second rupture disk assembly optionally may include a support member having spaced apart first and second ends and adapted to be inserted into the recessed region of the annular support portion second end such that the first end of the support member abuts and supports the rupture membrane. The support member is configured to permit fluid flow or fluid communication between the second end of the annular support portion and the rupture membrane.

The first and second rupture disk assemblies are positioned in stacked alignment such that the second ends of the annular support portions are adjacent and the first ends of the annular support portions face outwardly toward the process and vent sides respectively. This orientation of the first rupture disk assembly in inverted orientation and the second rupture disk in mono orientation (as viewed from the process side) is referred to as a stacked configuration. As viewed from the process side, the planar side of the first rupture disk faces the process side followed by the recessed side of the second rupture disk.

Preferably, the recessed region of each rupture disk is cylindrical in shape and the rupture membrane has a substantially uniform thickness. An annular steel casing surrounds the outer surface of each rupture disk annular support portion to add strength, support and durability to the rupture disk. The ends of the annular steel casing are aligned in the axial direction with the first and second ends of the rupture disk annular support portion. The rupture disk is bonded to an inner surface of the steel casing.

The first and second rupture disk assemblies are mechanically affixed by a plurality of brackets which extend between rivets inserted into the outer walls of the respective metal bands of each of the assemblies. Each of the plurality of brackets includes a hole for one rivet of the first rupture disk assembly and a slotted opening to accept the corresponding rivet of the second rupture disk assembly. An impervious gasket such as polytetrafluoroethylene (PTFE), having a thickness of approximately 0.125 inch is sandwiched between the two rupture disk assemblies. Additionally, a pair of gaskets, for example, PTFE gaskets also having a thickness of approximately 0.125 inch are sandwiched between the opposing flanges and opposite ends of the stacked rupture disk assembly.

A ¼ inch NPT gauge tapped hole is drilled through the side of first rupture disk assembly so that the pressure of the space defined by the recessed regions of the first and second rupture disks may be monitored. A gauge and valve assembly is threaded into the tapped hole. The pressure gauge monitors pressure of the space.

In one preferred embodiment of the present invention, the second rupture disk assembly includes a support member to reinforce and increase the capability of the stacked rupture disk assembly to withstand vent side back pressure without failure compared to what the vent side back pressure capability would be without the support member. In a second preferred embodiment of the present invention, no support member is used in the second rupture disk assembly. If the vent side back pressure capability of the second rupture disk assembly is sufficiently great by itself to prevent undesired vent side back pressure rupture of the stacked rupture disk assembly, then no support is necessary for the second rupture disk assembly. Advantageously, since the planar side of the second rupture disk faces the vent side (i.e., it is in mono orientation with respect to the process side), the capability of the second rupture disk assembly to withstand vent side back pressure will be relatively high compared to its process side burst pressure. Thus, the present invention provides a desired high capability to withstand vent side back pressure and provides a planar rupture disk surface facing the process side. Given the high vent side pressure capability of the second rupture disk assembly (because of its orientation), under a wide range of expected operating conditions, the second preferred embodiment (without support member) of the stacked rupture disk assembly will be sufficient to provide adequate vent side back pressure capability.

In the first stacked rupture disk embodiment, the support member is comprised of graphite and in one embodiment comprises a bar shaped member that is rectangular in cross section. In a second alternate embodiment, the support member comprises a cross shaped member. In a third alternate embodiment, the support member comprises a plate that is cylindrical with a plurality of apertures extending longitudinally through the member. The support member is adhesively attached to the second rupture disk.

The pressure rating of the second rupture disk assembly (as viewed from the process side) must always be equal to or less than the pressure rating of the first rupture disk assembly such that if the first rupture disk ruptures from excess pressure in the pressure vessel it is certain the second rupture disk will also rupture thereby releasing the pressure in the pressure vessel. Further, the presence of the second rupture disk insulates or isolates the first rupture disk from exposure to vent pressure and fugitive gas present in the vent pipe beyond the second rupture disk assembly.

These and other objects, advantages, and features of an exemplary embodiment of the present invention are described in detail in conjunction with the accompanying drawings.

BRIEF DESCRIPTION OF THE DRAWINGS

FIG. 1 is an exploded front elevation view of a first preferred embodiment of a duplex configuration, stacked rupture disk assembly of the present invention;

FIG. 2 is front elevation view of the stacked rupture disk of FIG. 1;

FIG. 4 is a perspective view a cross piece center support member;

FIG. 5 is a perspective view a plate support member;

FIG. 6 is a schematic representation of a common header discharge collection for a plurality of pressure vessels; and FIG. 7 is a longitudinal sectional view of a second preferred embodiment of a duplex configuration, stacked rupture disk assembly of the present invention.

DETAILED DESCRIPTION OF THE EXEMPLARY EMBODIMENT OF THE INVENTION

Figure 3:
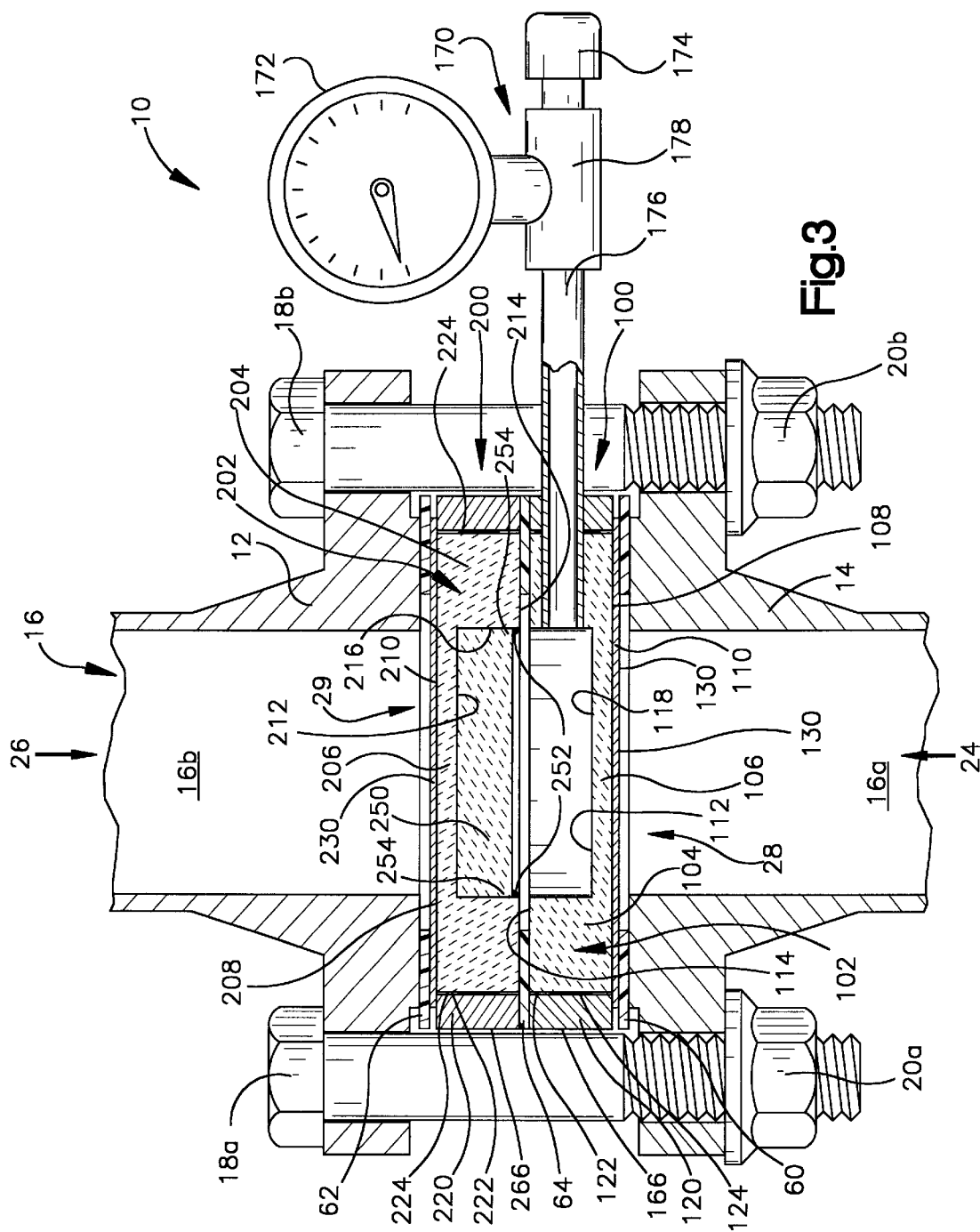
FIG. 3 is longitudinal sectional view of the stacked rupture disk of FIG. 1.

Turning to FIGS. 1–3, a first preferred embodiment of a stacked rupture disk assembly of the present invention is shown generally at 10. As can be seen in FIG. 3, the stacked rupture disk assembly is mounted between flanges 12, 14 in a vent pipe or pressure relief port 16 so as to obturate the passageway defined by vent pipe 16. Four bolts 18 (two of which can be seen in FIG. 3) and four nuts 20 (two of which can be seen in FIG. 3) extend between opposing flanges 12, 14 to secure the stacked rupture disk assembly 10 in place.

The stacked rupture disk assembly 10 includes first and second rupture disk assemblies 100, 200 affixed in vertical alignment with respect to the vent pipe 16. A lower section 16a of the vent pipe 16 is coupled to a pressure vessel 30 (FIG. 6). For ease of reference, the passageway defined by the lower section 16a of the vent pipe 16 will be referred to as the process facing side or the process side 24. An outwardly facing surface or end 28 of the rupture disk assembly 10 is subjected to pressure from the process side 24 (process side pressure) will be referred to as the process side end 28 of the rupture disk assembly 10. An upper section 16a of the vent pipe 16 is coupled to a piping system such as a common header pressure system 31 (shown in FIG. 6 and explained below).

The passageway defined by the vent pipe upper section 16b will be referred to as the vent facing side or the vent side 26. An outwardly facing surface or end 29 of the rupture disk assembly 10 is subjected to pressure from the vent side 26 (vent side pressure or vent side back pressure) will be referred to as the vent side end 29 of the rupture disk assembly 10.

The stacked rupture disk assembly 10 is mounted between the flanges 12, 14 in what will be referred to as a stacked configuration. The stacked configuration means that the first rupture disk assembly 100, which is adjacent the process side, includes a graphite rupture disk 102 mounted in the inverted orientation with respect to the process side and the second rupture disk assembly 200, which is adjacent the vent side 26, includes a graphite rupture disk 202 mounted in the mono orientation with respect to the process side 24.

As can be seen in FIG. 1, the rupture disk 102 comprises an annular support portion 104 and a pressure sensitive membrane portion 106 that is integral with the annular support portion. The annular support portion 104 of the rupture disk forms an annular base that is thicker in the axial direction than the pressure sensitive membrane portion 106 of the rupture disk 102. The membrane portion 106 is adjacent and flush with a first end 108 of the annular support portion 104. The first end 108 of the annular support portion 104 and the rupture membrane 106 define a substantially planar end or outer surface 110 of the rupture disk 102.

The annular support portion 104 includes a recessed region 112 extending axially inwardly from an opening in a second end 114 of the annular support portion 104 to the rupture membrane 106. The second end 114 of the annular support portion 104 and the rupture membrane 106 define a recessed end or recessed outer surface 118 of the rupture disk 102.

To add strength, support and durability to the rupture disk 102, an outer casing 120 comprised of carbon steel or, alternatively, stainless steel, surrounds the outer circumferential surface 122 of the rupture disk 102 and has the same axial dimension as the disk. The casing 120 comprises a cylinder and is bonded to the outer circumferential surface 122 with a layer 124 of carbonaceous cement approximately 0.015 inches thick formed of a carbonaceous powder mixed with phenolic or epoxy resin binder and an accelerator such as hypophosphoric acid.

The structure of the second rupture disk assembly 200 is identical to the first rupture disk assembly 100. The rupture disk assembly 200 includes a rupture disk 202. The disk 202 comprises an annular support portion 204 and a pressure sensitive membrane portion 206 that is integral with the annular support portion. The annular support portion 204 of the rupture disk 202 forms an annular base that is thicker in the axial direction than the pressure sensitive membrane portion 206 of the rupture disk 202. The membrane portion 206 is adjacent and flush with a first end 208 of the annular support portion 204.

The first end 208 of the annular support portion 204 and the rupture membrane 206 define a substantially planar end or outer surface 210 of the rupture disk 202. The annular support portion 204 includes a recessed region 212 extending axially inwardly from an opening in a second end 214 of the annular support portion 204 to the rupture membrane 206. The second end 214 of the annular support portion 204 and the rupture membrane 206 define a recessed end or recessed outer surface 218 of the rupture disk 202.

An outer casing 220 comprised of carbon steel or, alternatively, stainless steel, surrounds the outer circumferential surface 222 of the rupture disk 202 and has the same axial dimension as the rupture disk 202. The casing 220 comprises a cylinder and is bonded to the outer circumferential surface 222 with a layer 224 of carbonaceous cement approximately 0.015 inches thick formed of a carbonaceous powder mixed with phenolic or epoxy resin binder and an accelerator such as hypophosphoric acid.

The rupture disk 202 further includes a support member 250 disposed within a center recessed region 212 extending axially inwardly from an opening in a second end 214 of an annular support portion 204. The support member 250 is comprised of graphite and is adhesively attached to an inner circumferential surface 216 of the annular support portion 204 of the rupture membrane 206 utilizing the same carbonaceous cement described above. Small quantities 252 of carbonaceous cement are applied to a bottom edge portions 254 of the support member 250 and corresponding portions of the inner circumferential surface 216. Since the center support member 250 has a slightly smaller axial dimension than the axial depth of the recessed region 212, the small quantities 252 of carbonaceous cement do not extend beyond a second end 214 of the annular support portion 204. Advantageously, the support member 250 reinforces the rupture membrane 206 and increases a vent side burst pressure that the rupture membrane 206 may withstand without rupturing. The support member 250 may also be fabricated of metal.

A typical example of a rupture disk assembly 10 suitable for mounting in a 2 inch internal diameter vent pipe and having a burst pressure rating of 40 psig +/−5% tolerance (viewed from the process side) would be as follows. The outer diameters of the casings 120, 220 of first and second rupture disk assemblies 100, 200 are approximately 4 inches. The outer diameters of the rupture disk annular support portions 104, 204 are approximately 3.375 inches. The axial thickness of annular support portions 104, 204 are approximately 0.875 inch. The rupture membranes 104, 204 have a diameter of approximately 2 inches and have an axial thickness that is suitable to achieve a desired process side burst pressure.

The process side burst pressure of the second rupture disk assembly 200 is 35 psig, while the vent side back pressure capability or protection of the second rupture disk assembly 200 is significantly greater than 35 psig. It is important to note, however, that without the bar shaped center support member 250, the vent side back pressure capability would still be greater than 35 psig.

Alternately, if additional vent side back pressure capability is desired, instead of the bar or rectangular shaped support member 250, one of the cross piece and plate supports 260, 270 shown in FIGS. 4 and 5 respectively may be utilized. Use of the cross piece support 260 in place of the bar shaped support 250 would further increase the vent side back pressure capability of the second rupture disk assembly 200 (and, therefore, of the stacked rupture disk assembly 10). Use of the plate support 270 in place of the cross piece support 260 would additionally increase the vent side back pressure capability of the second rupture disk assembly 200 (and, therefore, of the stacked rupture disk assembly 10).

The selection of the configuration of the support member—cylindrical plate with holes 270, cross bar 260 or single bar 250 is dependent on the magnitude of vent side back pressure the rupture disk assembly 10 will be subjected to and the size and the desired process side burst rating of the duplex rupture disk assembly 10. Generally, it is desirable to minimize the cross sectional area of the center support as a proportion of the area of the rupture member 202 since flow from the first rupture disk assembly 100 upon rupture of the first rupture disk membrane 106 through to the surface of the second rupture disk rupture membrane 206 should be as unimpeded as possible so that the second rupture disk membrane 206 will also be sure to rupture. However, the greater the expected magnitude of the vent side back pressure the second rupture disk 202 is exposed to, the greater the support cross sectional area needed to prevent undesired rupture of the second rupture disk 202 by surges in vent side back pressure.

As can best be seen in FIGS. 2 and 3, the first and second rupture disk assemblies are mechanically affixed by three brackets 40, 42, 44 which extend between three rivets 160, 162, 164 riveted into apertures in an outer circumferential surface 166 of the casing 120 and three rivets riveted into apertures in an outer circumferential surface 286 of the casing 220. Only two of the rivets 280, 282 riveted into circumferential surface 286 are shown in the Figures. Each of the brackets 40, 42, 44 includes a hole 40a, 42a, 44a near one end of the bracket through which a respective one of the rivets 160, 162, 164 of the first rupture disk assembly 100 extends, a head of each rivet abutting a region adjacent the hole of its respective bracket to hold it in place against the casing 120. Near the opposite end of each of the three brackets 40, 42, 44 is a vertically disposed slot shaped openings 40b, 42b, 44b. The three rivets of the second rupture disk assembly 200 extend through the slot shaped openings 40b, 42b, 44b, a head of each rivet abutting a region adjacent the slot shaped opening of its respective bracket to hold it in place against the casing 220.

The fact that the second rupture disk assembly 200 can move vertically with respect to the first rupture disk assembly 100 because of the slot shaped openings 40b, 42b, 44b is of no consequence because the flange nuts 18 and flange bolts 20 tighten the flanges 12, 14 against PTFE gaskets 60, 62 (FIGS. 1 and 3) disposed adjacent opposite ends 28, 29 of the stacked disk assembly to sandwich the assembly 10 and the gaskets 60, 62 and the flanges 12, 14 in a fluid tight relationship. A third PTFE gasket 64 having a thickness of approximately 0.125 inch is also sandwiched between the two rupture disk assemblies 100, 200 in fluid tight relationship. Like the gasket 64, the pair of PTFE gaskets 60, 62 also have a thickness of approximately 0.125 inch, a width of 0.75 inch and an outer diameter corresponding to the outer diameter of the casings 120, 220, namely, approximately 4 inches (class 150 ANSI). The gaskets 60, 62, 64 are held in place by pressure sensitive adhesive. A thin overlay 130 is applied to the planar outer surface 110 of the rupture disk 102 for corrosion and/or heat protection. The overlay 130 may be coated directly onto the outer surface 110 or added as a distinct and separate layer. Preferably, the overlay 130 is a distinct and separate layer. It has been found that the use of coatings increases the burst pressure of the rupture disk that they are applied to. Preferably, the overlay 130 does not increase or decrease the burst pressure of the rupture disk 102. Preferably, the impervious overlay 130 is cemented to the annular support portion 104 such that the overlay is disposed over the rupture membrane 106 but is not adhesively attached to the rupture disk rupture membrane 106.

It has been found that cementing the overlay 130 to the rupture membrane 106 affects burst pressure rating similarly to direct coating. For example, a 3 mil PTFE overlay bonded to the rupture membrane could add 1 psig of burst pressure strength. Materials for the membrane include those materials corrosive resistant to chemicals and generally insensitive to operating temperatures in the pressure vessel 30. Preferably, the material used for the overlay 130 is easily formed into thin layers.

Preferred overlay materials include thin glass, metals, plastics, urethane, elastomers or the like. Suitable metals include nickel, monel, inconel, hastelloy C, tantalum, stainless steel and the like. Suitable plastics include polyparaphenylene terephthalamide sold under the trademark KEVLAR®, PTFE such as TEFLON® brand PTFE or PFA and polyvinylidene fluoride sold under the trademark KYNAR®. Suitable elastomers include neoprene, or VITON® brand elastomer or HYPALON® brand elastomer. Urethane and urethane acrylic are also suitable as overlay materials. Metals are relatively temperature insensitive as compared to plastics and typically can operate at higher temperatures than plastics, while plastics, glass, and elastomers are highly corrosive resistant. The overlay 230 may be comprised of a plurality of individual layers of different or the same material, e.g., a PTFE layer disposed adjacent a elastomer or urethane layer.

Advantageously, a similar overlay 230 may be applied to the planar outer surface 210 of the rupture disk 202 for corrosion and/or heat protection. Again, it is preferred that the overlay 230 be a distinct and separate layer rather than a coating which increase the burst pressure of the rupture membrane 206. While increased burst pressure is not a disadvantage when looking at the second rupture disk 202 from the vent side, it is important that the burst pressure of the second rupture disk 202 when viewed from the process side must be less than the burst pressure rating of the first rupture disk 102. If the burst pressure rating of the first rupture disk (which is also the burst pressure rating of the stacked rupture disk assembly 10) is exceeded and the first rupture disk ruptures, then it is imperative that the second rupture disk also rupture to avoid failure of the pressure vessel 30. Thus, the burst pressure of the second rupture disk 202 when viewed from the process side must be equal to or less than the burst pressure rating of the first rupture disk 102.

If the overlay 230 is a coating that increases burst pressure of the second rupture disk 202, the possibility of the second rupture disk 202 failing to rupture upon rupture of the first rupture disk 102 increases which, of course, is undesirable. It is important to note that both overlays 130, 230 are applied to the respective planar outer surfaces 110, 210 of the first and second rupture disks 102, 202. This is advantageous since it is much easier to affix such overlays to a flat surface than to the cylindrical shaped recessed surfaces 118, 228.

As can best be seen in FIG. 2, the first rupture disk assembly 100 includes a gauge and excess flow valve assembly 170. The gauge and relief valve assembly 170 includes a pressure gauge 172 for measuring the pressure in an interior space defined by the recessed regions 112, 212 of the first and second rupture disks 102, 202. The assembly further includes a excess flow or relief valve 174 to expel gas and thereby relieve pressure as necessary from the space defined by the recessed regions 112, 212. A ¼ inch NPT gauge tapped hole is drilled through the casing 120 and the annular support member 104. One end of a nipple 176 is threaded into the hole and female T connector 178 is threaded on the other end of the nipple 176. A fitting coupled to the pressure gauge 172 threads into a vertical end of T connector 178 and a fitting coupled to the excess flow valve 174 threads into a horizontal end of the T connector 178.

As seen in FIG. 2, a metal identification tag 180 is riveted to the outer circumferential surface 166 of the casing 120. The metal identification tag provides information about the product including the model number, size, process side burst pressure rating, flow direction, etc.

In FIG. 6, a plurality of stacked rupture disk assemblies 10, 10a, 10b of the present invention are shown in a portion of a common header discharge collection system 31. Each of the rupture disk assemblies 10, 10a, 10b are disposed between flanges 12, 14 in an vent pipe 16 of respective pressure vessels 30, 30a, 30b. Each pressure vessel 30, 30a, 30b has an internal region for processing a mixture of compounds introduced and each of the pressure vessels may be assume to have a different maximum internal region pressure. The vent pipes 16 of each of the pressure vessels 30, 30a, 30b terminate into and are in fluid communication with the internal region of a common header pipeline 32. The pipeline 32 routes any gases discharged into the vent pipes 16 into a catch tank or discharge collection vessel (not shown).

Each of the rupture disk assemblies 10, 10a, 10b has a predetermined process burst pressure rating that is accurate to +/−5% of the rated pressure. For example, the process burst pressure ratings may be 40 psig, 80 psig and 100 psig respectively for the rupture disk assemblies 10, 10a, 10b. Thus, if the pressure in the internal region of vessel coupled to assembly 10b exceeds 100 psig (process side pressure), the rupture disk assembly 10b' will rupture and materials and/or vapors from the pressure vessel 20b will leave the vessel through the vent pipe 16 and be routed through the common header pipeline 32 into the discharge collection vessel. The rupture of the rupture disk assembly 10b under such condition will prevent failure of the pressure vessel 30b from an over pressure condition.

Unique and advantageous to the present invention is the fact that the rupture disk assemblies are mounted in the vent pipes 16 in the stacked configuration. The stacked configuration means that is the planar surface 110 of the rupture disk 102 faces the process side and the planar surface 210 of the rupture disk 202 faces the vent side. As noted above, for all but very low burst pressure rupture disks (i.e., those having a burst pressure of around 1 psig), the burst pressure for pressure applied to the planar surface of a rupture disk exceeds the burst pressure for pressure applied to the recessed surface of a rupture disk.

Thus, the orientation of the rupture disk 202 in the stacked rupture disk assembly 10, that is, having the planer surface 210 of the rupture disk 202 facing the vent side means that the vent side pressure capability of the rupture disk is at a maximum. The support 250 increases the vent side pressure capability even more because it further supports the rupture membrane 206. Having the planar surface 210 of the rupture disk 202 face the vent side is highly desirable as the rupture disk 202 in this orientation will provide for maximum protection from unintended rupture of the rupture disk resulting from transitory surges in vent side pressure in the pipeline even when such surges exceed the burst pressure rating of the stacked rupture disk assembly 10.

To illustrate this point, assume that the rupture disk assembly 10b ruptures because the pressure in the vessel 30b exceeds 100 psig. Escaping gases from the vessel 30b will flow through the vent pipe 16 and into the common header pipeline 32. Depending on the of the pipeline 32 and the vent pipe 16, the volume of gas released from the vessel 30b and the distance between the vent pipes 16, it is possible that the vent side back pressure applied to the rupture disk assemblies 10, 10a from the gases present in the pipeline 32 may momentarily exceed the process side burst pressure of one or both of the rupture disk assemblies 10, 10a.

However, a stacked rupture disk assembly constructed in accordance with the present invention may advantageously be manufactured to withstand vent side back pressures far in excess of their corresponding process side burst pressure ratings, in fact, it is possible for a stacked rupture disk assembly constructed in accordance with the present invention to have a vent side back pressure capability of up to 2000 psig.

In FIG. 7, a second preferred embodiment of the stacked rupture disk assembly of the present invention is shown generally at 10'. The stacked rupture disk assembly 10' is comprised of first and second rupture disk assemblies 100', 200' affixed in vertical alignment with respect to opposing flanges 12', 14' of a vent pipe 16'. The structure of the assembly 10' is identical to the structure of the first embodiment stacked rupture disk assembly 10 except for the absence of a support member in the recessed region 212' of the second rupture disk 202' of the second rupture disk assembly 200'. With the exception of the absence of a support member and corresponding layer of cement to hold it in place within the recessed region, all other components of the stacked rupture disk assembly 10' correspond to the components described in the first embodiment stacked rupture disk 10.

The choice between the first and second stacked rupture disk assemblies 10, 10' depends upon the magnitude of the vent side pressure that the second rupture disk assembly 200' is expected to withstand without failure. Depending on the characteristics and dimensions of the second rupture disk 202', the rupture disk assembly 10' will be characterized by the capability of being able to withstand a particular vent side back pressure without failure. For example, as the diameter of the rupture membrane is decreased and the axial thickness of rupture member is increased, the vent side back pressure capability of the assembly 10' will increase. However, the dimension of the vent pipe internal diameter and the pipe flange outer diameter and axial distance between flanges will function to limit the characteristics and dimensions of the second rupture disk 202' and, correspondingly, limit the vent side back pressure capability of the rupture disk assembly 10'.

Additionally, as explained above, the vent side back pressure capability of the second rupture disk 202' must be equal to or less than the process side burst rating of the first rupture disk 102' to insure that when the process side burst rating is exceeded because of excess pressure in the pressure vessel 30 and the first rupture disk 102' ruptures it will also be the case that the second rupture disk 102' also ruptures in the flow direction to release pressure in the pressure vessel 30. Thus, the vent side back pressure capability of the second rupture disk 202' will be limited by virtue of the desired process side burst rating of the first rupture disk 102'. Given these limitations and requirements, the second rupture disk 202' will be characterized by some particular vent side back pressure capability. If this particular vent side back pressure capability safely exceeds the maximum expected vent side pressure the second rupture disk will be subjected to, then the stacked rupture disk embodiment 10' without a support member will be sufficient. If, on the other hand, the maximum expected vent side pressure is nearly equal to or greater than the vent side back pressure capability of the second rupture disk, then the stacked rupture disk assembly embodiment 10 that includes one of the three support members 250, 260, 270 will be required.

If the stacked rupture disk assembly 10 having a center support is required, the selection of the configuration of support member will depend on how much the vent side back pressure capability of the rupture disk assembly needs to be creased to comfortably exceed the maximum expected vent side pressure. As mentioned above, the bar support member 250 increases vent side back pressure capability the smallest amount of the three support members, while the plate 270 increases vent side back pressure capability the greatest amount of the three support member configurations. On the other hand, as explained above, it is desirable to minimize the area of the rupture membrane overlaid by the support member. Generally, the bar support member 250 overlies the least amount of area of the rupture membrane while the plate support member 270 overlies the greatest amount of area of the rupture membrane. Thus, the smallest cross sectional area support member that provides the requisite or desired increase in vent side back pressure capability would be selected for use in the stacked rupture disk assembly 10 of the first embodiment. While the preferred embodiment of the present invention has been described with a degree of particularity it is the intent that the invention include modifications from the disclosed design falling within the spirit or scope of the appended claims.

What is claimed is:

1. A stacked rupture disk assembly disposed between a pair of flanges in a vent pipe of a pressure vessel, the stacked rupture disk assembly comprising a) a first rupture disk assembly and a second rupture disk assembly affixed to the first rupture disk assembly;

b) each rupture disk assembly includes a graphite rupture disk defining an annular support portion surrounding an integral pressure sensitive rupture membrane, the rupture membrane being disposed adjacent a first end of the annular support portion defining a planar first outer surface of the rupture disk and a second end of the annular support portion surrounding a recessed region extending axially inwardly from the second end and defining a recessed second outer surface of the rupture disk; and c) the rupture disk assembly being positioned in the pair of flanges such that the planar first outer surface of the first rupture disk faces the pressure vessel and the recessed second outer surface of the first rupture disk faces the recessed second outer surface of the second rupture disk, the planar first outer surface of the first rupture disk being subjected to process side pressure from fluid present in a portion of the vent pipe between the pressure vessel and the rupture disk assembly and the planar first outer surface of the second rupture disk being subject to vent side pressure from fluid present in a portion of the vent pipe downstream of the rupture disk assembly.

2. The stacked rupture disk assembly of claim 1 wherein a support member is disposed in the recessed region of the second rupture disk adjacent the rupture membrane to support the rupture member and increase a vent side burst pressure of the second rupture disk, the support member configured to permit fluid communication between the second end of the second rupture disk annular support member and the rupture membrane.

3. The stacked rupture disk assembly of claim 2 wherein the support member is a bar being rectangular shaped in cross section.

4. The stacked rupture disk assembly of claim 2 wherein the support member is a cross piece being cross shaped in cross section.

5. The stacked rupture disk assembly of claim 2 wherein the support member is a cylindrical shaped plate having a plurality of longitudinal openings extending axially though the plate.

6. The stacked rupture disk assembly of claim 1 wherein outer circumferential surfaces of the first and second rupture disk annular support members are surrounded by respective annular metal casings.

7. The stacked rupture disk assembly of claim 6 wherein the casings are fabricated of stainless steel.

8. The stacked rupture disk assembly of claim 6 wherein the casings are fabricated of carbon steel.

9. The stacked rupture disk assembly of claim 1 wherein the planar first outer surface of the first rupture disk includes an overlay affixed to the first end of the annular support member for temperature protection and/or corrosion protection of the first rupture disk.

10. The stacked rupture disk assembly of claim 9 wherein the overlay is a thin layer of polytetrafluorethylene.

11. The stacked rupture disk assembly of claim 9 wherein the overlay is a thin metallic plate.

12. The stacked rupture disk assembly of claim 9 wherein the overlay is a thin layer of elastomer.

13. The stacked rupture disk assembly of claim 1 wherein the planar first outer surface of the second rupture disk includes an overlay affixed to the first end of the annular support member for temperature protection and/or corrosion protection of the first rupture disk.

14. The stacked rupture disk assembly of claim 13 wherein the overlay is a thin layer of polytetrafluorethylene.

15. The stacked rupture disk assembly of claim 13 wherein the overlay is a thin metallic plate.

16. The stacked rupture disk assembly of claim 13 wherein the overlay is a thin layer of elastomer.

17. The stacked rupture disk assembly of claim 1 wherein a pressure gauge assembly is coupled to the assembly such that the gauge is in fluid communication with and measures the pressure in a space defined by the recessed regions of the first and second rupture disks.

18. The stacked rupture disk assembly of claim 1 wherein a plurality of mounting brackets extend between the first and second rupture disk assemblies to mechanically affix the first and second rupture disk assemblies, the plurality of brackets each being secured at respective opposite ends to outer circumferential surfaces of the first and second rupture disk assemblies.

19. The stacked rupture disk assembly of claim 1 wherein an annular gasket is disposed between the second end of the first rupture disk annular support member and the second end of the second rupture disk annular support member.

20. The stacked rupture disk assembly of claim 1 wherein a first annular gasket is disposed between the first end of the first rupture disk annular support member and one of the pair of vent pipe flanges and a second annular gasket is disposed between the second end of the second rupture disk annular support member and the other of the pair of vent pipe flanges.

21. The stacked rupture disk assembly of claim 2 wherein the recessed region of the second rupture disk is cylindrical in shape.

22. The stacked rupture disk assembly of claim 2 wherein the support member is graphite.

23. The stacked rupture disk assembly of claim 17 wherein the pressure gauge assembly includes a excess pressure valve to release fluid from the space defined by the recessed regions of the first and second rupture disks if the pressure in the space exceeds a predetermined magnitude.

24. A stacked rupture disk assembly disposed between a pair of flanges in a vent pipe of a pressure vessel, the stacked rupture disk assembly comprising:

a) a first rupture disk assembly and a second rupture disk assembly aligned between the pair of flanges;

b) each rupture disk assembly including a graphite rupture disk defining an annular support portion surrounding an integral pressure sensitive rupture membrane, the rupture membrane being disposed adjacent a first end of the annular support portion defining a planar first outer surface of the rupture disk and a second end of the annular support portion surrounding a recessed region extending axially inwardly from the second end and defining a recessed second outer surface of the rupture disk; and c) the rupture disk assembly being positioned in the pair of flanges such that the planar first outer surface of the first rupture disk faces the pressure vessel.

25. The rupture disk assembly of claim 24 wherein the first rupture disk assembly is mechanically affixed to the second rupture disk assembly by at least one bracket spanning the first and second rupture disk assemblies.

26. The rupture disk assembly of claim 24 wherein a support member is disposed in the recessed region of the second rupture disk adjacent the rupture membrane to support the rupture member and increase a capability of The second rupture disk to withstand back pressure exerted from fluid in a portion of the vent pipe downstream of the second rupture disk without failure of the second rupture disk, the support member configured to permit fluid communication between the second end of the second rupture disk annular support member and the rupture membrane.

27. The rupture disk assembly of claim 24 wherein outer circumferential surfaces of the first and second rupture disk annular support members are surrounded by respective annular metal casings.

28. The rupture disk assembly of claim 24 wherein the planar first outer surface of the first rupture disk includes an overlay affixed to the first end of the annular support member for temperature protection and/or corrosion protection of the first rupture disk.

29. The rupture disk assembly of claim 28 wherein the overlay is a thin layer of polytetrafluorethylene.

30. The rupture disk assembly of claim 28 wherein the overlay is a thin metallic plate.

31. The rupture disk assembly of claim 28 wherein the overlay is a thin layer of elastomer.

32. The rupture disk assembly of claim 24 wherein the planar first outer surface of the second rupture disk includes an overlay affixed to the first end of the annular support member for temperature protection and/or corrosion protection of the first rupture disk.

33. The rupture disk assembly of claim 24 wherein a pressure gauge assembly is coupled to the assembly such that the gauge is in fluid communication with and measures the pressure in a space defined by the recessed regions of the first and second rupture disks.

34. The rupture disk assembly of claim 24 wherein a plurality of mounting brackets extend between the first and second rupture disk assemblies to mechanically affix the first and second rupture disk assemblies, the plurality of brackets each being secured at respective opposite ends to outer circumferential surfaces of the first and second rupture disk assemblies.

35. The rupture disk assembly of claim 24 wherein an annular gasket is disposed between the second end of the first rupture disk annular support member and the second end of the second rupture disk annular support member.

36. The rupture disk assembly of claim 24 wherein a first annular gasket is disposed between the first end of the first rupture disk annular support member and one of the pair of vent pipe flanges and a second annular gasket is disposed between the second end of the second rupture disk annular support member and the other of the pair of vent pipe flanges.

37. The rupture disk assembly of claim 24 wherein the recessed regions of the first and second rupture disks are cylindrical in shape.

38. The rupture disk assembly of claim 2 wherein the support member is graphite.

* * * * *